(12) United States Patent
Nakano et al.

(10) Patent No.: US 10,075,371 B2
(45) Date of Patent: Sep. 11, 2018

(54) COMMUNICATION SYSTEM, CONTROL APPARATUS, PACKET HANDLING OPERATION SETTING METHOD, AND PROGRAM

(75) Inventors: Takahiro Nakano, Tokyo (JP); Masashi Numata, Tokyo (JP); Masakatsu Yanagisawa, Tokyo (JP); Shunji Motomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 13/824,360

(22) PCT Filed: Oct. 19, 2011

(86) PCT No.: PCT/JP2011/074019
§ 371 (c)(1),
(2), (4) Date: Mar. 16, 2013

(87) PCT Pub. No.: WO2012/053540
PCT Pub. Date: Apr. 26, 2012

(65) Prior Publication Data
US 2013/0177016 A1 Jul. 11, 2013

(30) Foreign Application Priority Data
Oct. 19, 2010 (JP) .................... 2010-234752

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4633* (2013.01); *H04L 45/245* (2013.01);
(Continued)

(58) Field of Classification Search
None
See application file for complete search history.

(56) References Cited

U.S. PATENT DOCUMENTS

| 7,035,259 B2 | 4/2006 | Nomura et al. |
| 7,483,378 B2 * | 1/2009 | Chikamatsu ............... 370/235.1 |

(Continued)

FOREIGN PATENT DOCUMENTS

| CN | 101005437 A | 7/2007 |
| CN | 101107824 A | 1/2008 |

(Continued)

OTHER PUBLICATIONS

Nick McKeown, Tom Anderson, Hari Balakrishnan, Guru Parulkar, Larry Peterson, Jennifer Rexford, Scott Shenker, and Jonathan Turner. Openflow: Enabling innovation in campus networks Mar. 2008. SIGCOMM CCR, vol. 38, 69-74.*

(Continued)

*Primary Examiner* — Noel R Beharry
*Assistant Examiner* — Wilfred Thomas
(74) *Attorney, Agent, or Firm* — McGinn I.P Law Group, PLLC.

(57) ABSTRACT

A control apparatus sets, in a node located at the start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output. The packets respectively belong to the individual flows, and each of the packets is to be forwarded through a corresponding one of the two or more packet forwarding paths. Further, the control apparatus sets, in a (Continued)

node located intermediate on the aggregatable segment, a common packet handling operation for causing the packet that matches the path identifier to be forwarded according to the packet forwarding path. Then, the control apparatus sets, in a node located at the end point of the aggregatable segment, a packet handling operation for performing restoration and forwarding based on the flow identifier.

18 Claims, 13 Drawing Sheets

(51) Int. Cl.
  *H04L 12/709* (2013.01)
  *H04L 12/721* (2013.01)
  *H04L 12/723* (2013.01)
(52) U.S. Cl.
  CPC .............. *H04L 45/38* (2013.01); *H04L 45/50* (2013.01); *Y02D 50/30* (2018.01)

(56) References Cited

U.S. PATENT DOCUMENTS

| | | | |
|---|---|---|---|
| 7,606,147 B2* | 10/2009 | Luft et al. | 370/229 |
| 7,724,736 B2 | 5/2010 | Maeda et al. | |
| 2001/0019554 A1* | 9/2001 | Nomura et al. | 370/389 |
| 2002/0044553 A1* | 4/2002 | Chakravorty | 370/392 |
| 2003/0123386 A1* | 7/2003 | Yang | H04L 47/10 370/229 |
| 2005/0083936 A1* | 4/2005 | Ma | 370/392 |
| 2006/0072543 A1* | 4/2006 | Lloyd et al. | 370/351 |
| 2006/0159084 A1 | 7/2006 | Shimizu et al. | |
| 2006/0182105 A1 | 8/2006 | Kim et al. | |
| 2007/0147244 A1* | 6/2007 | Rasanen | 370/231 |
| 2008/0031271 A1 | 2/2008 | Maeda et al. | |
| 2008/0089233 A1* | 4/2008 | Shimojo | H04L 41/00 370/236 |
| 2008/0189769 A1 | 8/2008 | Casado et al. | |
| 2011/0261825 A1 | 10/2011 | Ichino | |

FOREIGN PATENT DOCUMENTS

| | | |
|---|---|---|
| EP | 1 585 263 A1 | 10/2005 |
| JP | 2001-251343 A | 9/2001 |
| JP | 2002-223235 A | 8/2002 |
| JP | 2006-197591 A | 7/2006 |
| WO | WO 03/045016 A1 | 5/2003 |
| WO | WO 2006/070197 A2 | 7/2006 |
| WO | WO 2006/106588 A1 | 10/2006 |
| WO | WO 2008/095010 A1 | 8/2008 |
| WO | WO 2010/103909 A1 | 9/2010 |

OTHER PUBLICATIONS

European Search Report dated Jul. 11, 2014.
Japanese Office Action dated Sep. 9, 2014 with a partial English translation.
Yoshitake Tajima, et al., "A Traffic Engineering Scheme in a Global Networking Service Platform" The Institute of Electronics, Information and Communication Engineers, pp. 241-248, Mar. 2001.
International Search Report in PCT/JP2011/074019 dated Nov. 15, 2011 (with English translation thereof).
Shimonishi et al.,"A network OS for integrated control plane and its application to OpenFlow controller", IEICE Technical Report, vol. 109, No. 448, Feb. 25, 2010, pp. 1-6.
"OpenFlow Switch Specification" Version 1.1.0. (Wire Protocol 0x01) Dec. 31, 2009 [Searched on Sep. 21, Heisei 22 (2010)], Internet <URL: http://www.openflowswitch.org/documents/openflow-spec-v1.0.0.pdf>.
Nick McKeown et al, "OpenFlow: Enabling Innovation in Campus Networks", Mar. 14, 2008 [Searched on Sep. 21, Heisei 22 (2010)], Internet <URL: http://www.openflowswitch.org//documents/openflow-wp-latest.pdf>.
Japanese Notice of Grounds for Rejection dated Aug. 18, 2015 with a partial English translation thereof.
Chinese Office Action dated Feb. 8, 2018 in Chinese Application No. 201510145645.9 with an English translation thereof.

* cited by examiner

FIG. 4

| PATH ID (MAC DA FOR AGGREGATION) | PATH |
|---|---|
| E1 | OFS_A, OFS_B, OFS_C, OFS_E |
| E2 | OFS_A, OFS_B, OFS_D, OFS_E |
| ... | ... |

FIG. 5

| FLOW ID | MAC SA | PATH ID (MAC DA FOR AGGREGATION) | MAC SA |
|---|---|---|---|
| 1 | MAC ADDRESS OF TERMINAL A | E1 (PATH 1) | MAC ADDRESS OF TERMINAL C |
| 2 | MAC ADDRESS OF TERMINAL A | E1 (PATH 1) | MAC ADDRESS OF TERMINAL D |
| 3 | MAC ADDRESS OF TERMINAL B | E1 (PATH 1) | MAC ADDRESS OF TERMINAL C |
| 4 | MAC ADDRESS OF TERMINAL B | E2 (PATH 2) | MAC ADDRESS OF TERMINAL D |
| .. | .. | .. | .. |

FIG. 7

| FLOW ID | OFS_A | OFS_B | OFS_C | OFS_D | OFS_E |
|---|---|---|---|---|---|
| 1 | MATCH<br>  IN_PORT:1<br>  DL_SRC:TERMINAL A<br>  DL_DST:TERMINAL C<br>ACTION<br>  SET_DL_SRC:1<br>  SET_DL_DST:E1<br>  OUT_PORT :10 | MATCH<br>  IN_PORT:11<br>  DL_DST:E1<br>ACTION<br>  OUT_PORT :12 | MATCH<br>  IN_PORT:13<br>  DL_DST:E1<br>ACTION<br>  OUT_PORT :14 | | MATCH<br>  IN_PORT:15<br>  DL_SRC:1<br>  DL_DST:E1<br>ACTION<br>  SET_DL_SRC:TERMINAL A<br>  SET_DL_DST:TERMINAL C<br>  OUT_PORT :3 |
| 2 | MATCH<br>  IN_PORT:1<br>  DL_SRC:TERMINAL A<br>  DL_DST:TERMINAL D<br>ACTION<br>  SET_DL_SRC:2<br>  SET_DL_DST:E1<br>  OUT_PORT :10 | | | | MATCH<br>  IN_PORT:15<br>  DL_SRC:2<br>  DL_DST:E1<br>ACTION<br>  SET_DL_SRC:TERMINAL A<br>  SET_DL_DST:TERMINAL D<br>  OUT_PORT :4 |
| 3 | MATCH<br>  IN_PORT:2<br>  DL_SRC:TERMINAL B<br>  DL_DST:TERMINAL C<br>ACTION<br>  SET_DL_SRC:3<br>  SET_DL_DST:E1<br>  OUT_PORT :10 | | | | MATCH<br>  IN_PORT:15<br>  DL_SRC:3<br>  DL_DST:E1<br>ACTION<br>  SET_DL_SRC:TERMINAL B<br>  SET_DL_DST:TERMINAL C<br>  OUT_PORT :3 |
| 4 | MATCH<br>  IN_PORT:2<br>  DL_SRC:TERMINAL B<br>  DL_DST:TERMINAL D<br>ACTION<br>  SET_DL_SRC:3<br>  SET_DL_DST:E2<br>  OUT_PORT :10 | MATCH<br>  IN_PORT:11<br>  DL_DST:E2<br>ACTION<br>  OUT_PORT :21 | | MATCH<br>  IN_PORT:22<br>  DL_DST:E2<br>ACTION<br>  SET_DL_SRC:TERMINAL B<br>  SET_DL_DST:TERMINAL D<br>  OUT_PORT :23 | MATCH<br>  IN_PORT:24<br>  DL_SRC:3<br>  DL_DST:E2<br>ACTION<br>  SET_DL_SRC:TERMINAL B<br>  SET_DL_DST:TERMINAL D<br>  OUT_PORT :4 |

FIG. 8

| FLOW ID | OFS_A | OFS_B | OFS_C | OFS_D | OFS_E |
|---|---|---|---|---|---|
| 1 | MATCH<br>  IN_PORT:1<br>  DL_SRC:TERMINAL A<br>  DL_DST:TERMINAL C<br>ACTION<br>  OUT_PORT :10 | MATCH<br>  IN_PORT:11<br>  DL_SRC: TERMINAL A<br>  DL_DST: TERMINAL C<br>ACTION<br>  OUT_PORT :12 | MATCH<br>  IN_PORT:13<br>  DL_SRC: TERMINAL A<br>  DL_DST: TERMINAL C<br>ACTION<br>  OUT_PORT :14 | | MATCH<br>  IN_PORT:15<br>  DL_SRC: TERMINAL A<br>  DL_DST: TERMINAL C<br>ACTION<br>  OUT_PORT :3 |
| 2 | MATCH<br>  IN_PORT:1<br>  DL_SRC: TERMINAL A<br>  DL_DST: TERMINAL D<br>ACTION<br>  OUT_PORT :10 | MATCH<br>  IN_PORT:11<br>  DL_SRC: TERMINAL A<br>  DL_DST: TERMINAL D<br>ACTION<br>  OUT_PORT :12 | MATCH<br>  IN_PORT:13<br>  DL_SRC: TERMINAL A<br>  DL_DST: TERMINAL D<br>ACTION<br>  OUT_PORT :14 | | MATCH<br>  IN_PORT:15<br>  DL_SRC: TERMINAL A<br>  DL_DST: TERMINAL D<br>ACTION<br>  OUT_PORT :4 |
| 3 | MATCH<br>  IN_PORT:2<br>  DL_SRC: TERMINAL B<br>  DL_DST: TERMINAL C<br>ACTION<br>  OUT_PORT :10 | MATCH<br>  IN_PORT:11<br>  DL_SRC: TERMINAL B<br>  DL_DST: TERMINAL C<br>ACTION<br>  OUT_PORT :12 | MATCH<br>  IN_PORT:13<br>  DL_SRC: TERMINAL B<br>  DL_DST: TERMINAL C<br>ACTION<br>  OUT_PORT :14 | | MATCH<br>  IN_PORT:15<br>  DL_SRC: TERMINAL B<br>  DL_DST: TERMINAL C<br>ACTION<br>  OUT_PORT :3 |
| 4 | MATCH<br>  IN_PORT:2<br>  DL_SRC: TERMINAL B<br>  DL_DST: TERMINAL D<br>ACTION<br>  OUT_PORT :10 | MATCH<br>  IN_PORT:11<br>  DL_SRC: TERMINAL B<br>  DL_DST: TERMINAL D<br>ACTION<br>  OUT_PORT :21 | | MATCH<br>  IN_PORT:22<br>  DL_SRC: TERMINAL B<br>  DL_DST: TERMINAL D<br>ACTION<br>  OUT_PORT :23 | MATCH<br>  IN_PORT:24<br>  DL_SRC: TERMINAL B<br>  DL_DST: TERMINAL D<br>ACTION<br>  OUT_PORT :4 |

FIG. 9

| FLOWID | OFS_A | OFS_B | OFS_C | OFS_D | OFS_E |
|---|---|---|---|---|---|
| 5(1,3) | MATCH<br>  DL_DST:TERMINAL C<br>ACTION<br>  OUT_PORT :10 | MATCH<br>  IN_PORT:11<br>  DL_DST:TERMINAL C<br>ACTION<br>  OUT_PORT :12 | MATCH<br>  IN_PORT:13<br>  DL_DST:TERMINAL C<br>ACTION<br>  OUT_PORT :14 | | MATCH<br>  IN_PORT:15<br>  DL_DST:TERMINAL C<br>ACTION<br>  OUT_PORT :3 |
| 6(2,4) | MATCH<br>  DL_DST:TERMINAL D<br>ACTION<br>  OUT_PORT :10 | MATCH<br>  IN_PORT:11<br>  DL_DST:TERMINAL D<br>ACTION<br>  OUT_PORT :21 | | MATCH<br>  IN_PORT:22<br>  DL_DST:TERMINAL D<br>ACTION<br>  OUT_PORT :23 | MATCH<br>  IN_PORT:24<br>  DL_DST:TERMINAL D<br>ACTION<br>  OUT_PORT :4 |

FIG. 10

| | DETAILS | DIFFERENCE FROM PROCESSING RULE IN NONAGGREGATION MODE |
|---|---|---|
| MATCH | — | NO CHANGE |
| ACTION | SET_DL_SRC | CONVERSION TO FLOW ID |
| | SET_DL_DST | CONVERSION TO PATH ID |
| | OUT_PORT | NO CHANGE |

FIG. 11

| | DETAILS | DIFFERENCE FROM PROCESSING RULE IN NONAGGREGATION MODE |
|---|---|---|
| MATCH | IN_PORT | NO CHANGE |
| | DL_DST | SET PATH ID |
| | Other | NO NEED |
| ACTION | — | NO CHANGE |

FIG. 12

| | DETAILS | DIFFERNCE FROM PROCESSING RULE IN NONAGGREGATION MODE |
|---|---|---|
| MATCH | IN_PORT | NO CHANGE |
| | DL_SRC | DETERMINE BASED ON FLOW ID CONVERTED IN Ingress |
| | DL_DST | DETERMINE BASED ON PATH ID CONVERTED IN Ingress |
| ACTION | SET_DL_SRC | CONVERT TO MAC SA BEFORE CONVERTION IN Ingress |
| | SET_DL_DST | CONVERT TO MAC DA BEFORE CONVERSION IN Ingress |
| | OUT_PORT | NO CHANGE |

FIG. 13

| Wildcards | In Port | Ether SA (DL SRC) | Ether DA (DL DST) | Ether type | VLAN ID | VLAN PCP | IP SA | IP DA | IP proto | IP ToS bits | TCP/UDP src port | TCP/UDP dst port | Actions | Stats |

Matching Rule

COMMUNICATION SYSTEM, CONTROL APPARATUS, PACKET HANDLING OPERATION SETTING METHOD, AND PROGRAM

CROSS-REFERENCE TO RELATED APPLICATION

The present invention is based upon and claims the benefit of the priority of Japanese Patent Application No. 2010-234752 (filed on Oct. 19, 2010), the disclosure of which is incorporated herein in its entirety by reference.

TECHNICAL FIELD

The present invention relates to a communication system, a control apparatus, a node, a packet handling operation setting method, and a program. More specifically, the invention relates to a communication system in which a packet is forwarded through nodes disposed on a network to implement communication, a node, a control apparatus, a communication method, and a program.

BACKGROUND ART

A technology referred to as OpenFlow (OpenFlow) has been proposed in recent years, as shown in Patent Literature 1 and Non Patent Literatures 1 and 2. In the OpenFlow, communication is treated as an end-to-end flow, and path control, failure recovery, load distribution, and optimization are performed for each flow. An OpenFlow switch that functions as a forwarding node includes a secure channel for communication with an OpenFlow controller, and operates according to a flow table in which appropriate addition or rewriting is instructed by the OpenFlow controller. In the flow table, a set of a matching rule (matching rule) to be matched against a packet header, actions (Actions) defining processing content, and flow statistics information (Stats) is defined for each flow (refer to FIG. 13).

Action names and contents of actions are defined in Non Patent Literature 2 (see "3.3Actions"). OUTPUT means outputting a packet to a specified port (interface). SET_V-LAN_VID down to SET_TP_DST mean actions that modify the fields of a packet header.

For example, when receiving a first packet (first packet), the OpenFlow switch searches the flow table for an entry having a matching rule (matching rule) that matches header information on the received packet. When the entry that matches the received packet is found as a result of the search, the OpenFlow switch executes the processing content described in the action field of the entry on the received packet. On the other hand, when the entry that matches the received packet is not found as the result of the search, the OpenFlow switch forwards the received packet to the OpenFlow controller over the secure channel, asks the OpenFlow controller to determine the path of the packet based on the transmission source and the transmission destination of the received packet, receives a flow entry implementing this path, and then updates the flow table.

Patent Literature 2 discloses a layer 2 switch including a MAC learning table and a control apparatus for the layer 2 switch. The layer 2 switch comprises a conversion unit for converting VWAN-ID added to a frame into a degenerate VWAN-ID and a restoring unit for restoring the degenerate VWAN-ID added to the frame to the original VWAN-ID. The control apparatus for the layer 2 switch determines one degenerate VWAN-ID corresponding to this VWAN-ID and sets the determined degenerate VWAN-ID in the conversion unit and the restoring unit when the VWAN-ID is registered. According to this publication, the degenerate VWAN-ID is expressed with the number of a value smaller than the number of a value that may be adopted by the VWAN-ID. This layer 2 switch registers an entry including the degenerate VWAN-ID in the MAC learning table, using a MAC learning function.

[Patent Literature 1] International Publication No. WO2008/095010
[Patent Literature 2] International Publication No. WO2006/106588
[Non Patent Literature 1]
Nick McKeown and seven other authors, "OpenFlow: Enabling Innovation in Campus Networks", [online], [Searched on September 21, Heisei 22 (2010)], Internet <URL: http://www.openflowswitch.org//documents/openflow-wp-latest.pdf>
[Non Patent Literature 2]
"OpenFlow Switch Specification" Version 1.1.0. (Wire Protocol 0x01) [Searched on September 21, Heisei 22 (2010)], Internet <URL: http://www.openflowswitch.org/documents/openflow-spec-v1.0.0.pdf>

SUMMARY

Each disclosure of Patent literatures 1 and 2 and Non Patent literatures 1 and 2 listed above is incorporated herein by reference. Analysis results of problems associated with the related arts will be given below.

In the above-mentioned OpenFlow, it is possible to use a wild card for a packet handling operation. Even flows having different transmission sources but having a same destination can be aggregated to define a packet handling operation having a matching rule against which only the destination is to be matched (refer to FIGS. 8 and 9). By defining the packet handling operation by aggregating the flows as described above, a load on each node on a packet forwarding path (hereinafter referred to as the "node", also including a case where the node is an OpenFlow switch) and a management burden on the control apparatus (hereinafter referred to as the "control apparatus", also including a case where the control apparatus is an OpenFlow controller) can be reduced.

Each disclosure of Patent literatures 1 and 2 and Non Patent literatures 1 and 2 listed above is incorporated herein by reference. Analysis results of problems associated with the related arts will be given below.

In the above-mentioned OpenFlow, it is possible to use a wild card for a packet handling operation (processing rule). Even flows having different transmission sources but having a same destination can be aggregated to define a packet handling operation having a matching rule against which only the destination is to be matched (refer to FIGS. 8 and 9). By defining the packet handling operation by aggregating the flows as described above, a load on each node on a packet forwarding path (hereinafter referred to as the "node", also including a case where the node is an OpenFlow switch) and a management burden on the control apparatus (hereinafter referred to as the "control apparatus", also including a case where the control apparatus is an OpenFlow controller) can be reduced.

However, when the flows are aggregated into one flow, the granularity of the flow statistics information (Stats) to be counted at each node on the packet forwarding path is also based on the aggregated one flow. Thus, there is a problem that when an abnormal traffic occurs, identification of the flow that has caused the abnormal traffic becomes difficult.

On the other hand, assume that the flow statistics information (Stats) is to be obtained by strict matching using the transmission source/destination IP address of layer 3 (data link layer) of an OSI reference model or the L4 port number of layer 4 (transport layer) without performing the aggregation so as to identify the abnormal traffic. Then, there is a problem that the number of packet handling operation entries to be held by each node on the packet forwarding path will increase, leading to performance degradation of the node and complexity of a change in the path when a failure has occurred on the path.

It is therefore an object of the invention to provide a configuration capable of both aggregating packet handling operations and facilitating identification of a flow that has caused an abnormal traffic.

According to a first aspect of the present invention, there is provided a communication system including:

a plurality of nodes each of which processes a received packet according to a packet handling operation associating processing to be applied to a packet and a matching rule for identifying the packet to which the processing is to be applied, and records statistics information on the packet processed per the packet handling operation; and a control apparatus that sets the packet handling operation in each of the nodes; wherein the control apparatus sets, in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;

the control apparatus sets, in the node located intermediate on the aggregatable segment, a packet handling operation common to the respective flows for causing the packet that matches the path identifier to be forwarded according to the packet forwarding path; and the control apparatus sets, in the node located at an end point of the aggregatable segment, a packet handling operation for performing processing of restoring content rewritten in the node located at the start point of the aggregatable segment based on the flow identifier and then causing the packet to be output.

According to a second aspect, there is provided a control apparatus connected to a plurality of nodes each of which processes a received packet according to a packet handling operation associating processing to be applied to a packet and a matching rule for identifying the packet to which the processing is to be applied, and records statistics information on the packet processed per the packet handling operation;

the control apparatus setting:

in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;

in the node located intermediate on the aggregatable segment, a packet handling operation common to the respective flows for causing the packet that matches the path identifier to be forwarded according to the packet forwarding path; and in the node located at an end point of the aggregatable segment, a packet handling operation for performing processing of restoring content rewritten in the node located at the start point of the aggregatable segment based on the flow identifier and then causing the packet to be output.

According to a third aspect, there is provided a packet handling operation setting method of a control apparatus connected to a plurality of nodes each of which processes a received packet according to a packet handling operation associating processing to be applied to a packet and a matching rule for identifying the packet to which the processing is to be applied and records statistics information on the packet processed per the packet handling operation, the method including the steps of:

setting, in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;

setting, in the node located intermediate on the aggregatable segment, a packet handling operation common to the respective flows for causing the packet that matches the path identifier to be forwarded according to the packet forwarding path; and setting, in the node located at an end point of the aggregatable segment, a packet handling operation for performing processing of restoring content rewritten in the node located at the start point of the aggregatable segment based on the flow identifier and then causing the packet to be output. This method is linked with a specific machine, which is the control apparatus that sets the packet handling operation in each of the core node and the edge nodes described above.

According to a fourth aspect, there is provided a program for a computer constituting a control apparatus connected to a plurality of nodes each of which processes a received packet according to a packet handling operation associating processing to be applied to a packet and a matching rule for identifying the packet to which the processing is to be applied and records statistics information on the packet processed per the packet handling operation, the program causing the computer to execute processing of:

setting, in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;

setting, in the node located intermediate on the aggregatable segment, a packet handling operation common to the respective flows for causing the packet that matches the path identifier operation for performing processing of restoring content rewritten in the node located at the start point of the aggregatable segment based on the flow identifier and then causing the packet to be output. This program can be recorded in a computer readable recording medium. That is, the present invention can also be embodied as a computer program product.

The meritorious effects of the present invention are summarized as follows.

According to the present disclosure, it becomes possible to aggregate packet handling operations and facilitate identification of a flow that has caused an abnormal traffic. The reason for these advantageous effects is that a configuration has been adopted by which, in the node located at the start point of the aggregatable segment of the packet forwarding paths, statistics information on a packet processed for each packet handling operation can be collected and the packet handling operations are aggregated in the node located in the aggregatable segment.

BRIEF DESCRIPTION OF DRAWINGS

FIG. 4 shows examples of path information held according to the first exemplary embodiment of the present invention;

FIG. 5 is a table for explaining contents of conversion of MAC addresses performed by the control apparatus in the first exemplary embodiment of the present invention;

FIG. 7 is a table summarizing packet handling operations to be set in respective nodes by the control apparatus in the first exemplary embodiment of the present invention;

FIG. 8 is a table summarizing packet handling operations to be set in the respective nodes by the control apparatus in the first exemplary embodiment of the present invention in a nonaggregation mode;

FIG. 9 shows examples in each of which flows for the packet handling operations in FIG. 8 having a same destination have been aggregated.

FIG. 10 is a table showing a difference of a flow entry to be set in an Ingress OFS from that in the nonaggregation mode;

FIG. 11 is a table showing a difference of a flow entry to be set in a Core OFS from that in the nonaggregation mode;

FIG. 12 is a table showing a difference of a flow entry to be set in an Egress OFS from that in the nonaggregation mode; and FIG. 13 is a table showing a configuration of a flow entry described in Non Patent Literature 2.

PREFERRED MODES

Figure 1:
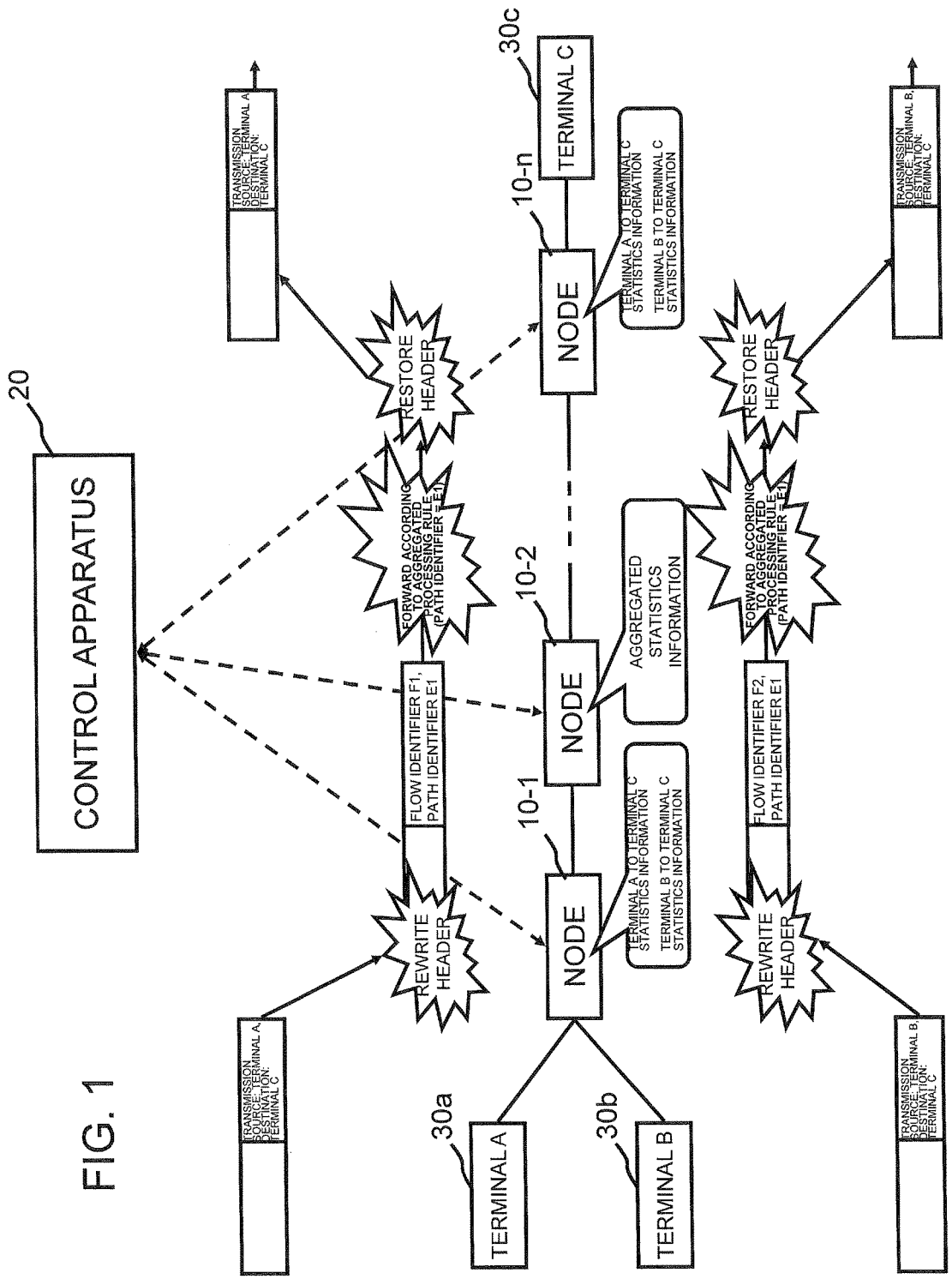
FIG. 1 is a diagram for explaining an overview of the present invention.

First, an overview of an exemplary embodiment of the present disclosure will be described. As shown in FIG. 1, the exemplary embodiment of the present disclosure can be implemented by nodes 10-1 to 10-n and a control apparatus 20. Each of the nodes 10-1 to 10-n processes a received packet according to a packet handling operation that associates processing to be applied to a packet and a matching rule for identifying the packet to which the processing is applied, and also records statistics information on the processed packet per the packet handling operation. The control apparatus 20 sets the packet handling operation in each of these nodes 10-1 to 10-n. A reference symbol in the drawing appended to this overview is appended to each element for convenience, as an example for helping understanding of the disclosure, and does not intend to limit the present invention to the mode illustrated in the drawing.

Assume that a forwarding path of a packet through a node 10-1, a node 10-2, . . . , and a node 10-n has been calculated as the forwarding path of the packet addressed from a terminal A (30a) to a terminal C (30c), for example. Similarly, assume that a forwarding path of a packet through the node 10-1, the node 10-2, . . . , and the node 10-n has been calculated as the forwarding path of the packet addressed from a terminal B (30b) to the terminal C (30c). The two packet forwarding paths therefore include an overlapping segment (aggregatable segment) from the node 10-1, the node 10-2, . . . , and the node 10-n.

In this case, the control apparatus 20 sets a packet handling operation for each flow in the node 10-1 located at the start point of the aggregatable segment. This packet handling operation is for performing processing of writing a flow identifier (e.g.: F1 or F2) and a path identifier (e.g.: E1) in a region of each of the packets to be matched against the matching rule, and then causing the packet to be output. The flow identifier is used for identifying the flow, and the path identifier is used for packet forwarding through the aggregatable segment. The packets respectively belong to the individual flows (from the terminal A to the terminal C, and from the terminal B to the terminal C), and each of the packets is to be forwarded through a corresponding one of the two or more packet forwarding paths.

The control apparatus 20 sets in each of the nodes 10-2, . . . , and the node 10 (n–1) located intermediate on the aggregatable segment a packet handling operation common to the respective flows. The packet handling operation is for causing the packet that matches the path identifier (e.g.: E1) to be forwarded according to the packet forwarding path.

The control apparatus 20 sets in the node 10-n positioned at the end point of the aggregatable segment a packet handling operation for performing processing of restoring content rewritten in the node located at the start point of the aggregatable segment, based on the flow identifier (e.g.: F1 or F2) and then causing the packet to be output.

With the above-mentioned arrangement, each of the packets addressed from the terminal A (30a) to the terminal C (30c) and addressed from the terminal B (30b) to the terminal C (30c) is rewritten to the packet including the flow identifier (e.g.: F1 or F2) and the path identifier (e.g.: E1) and is then forwarded through the aggregatable segment. Then, each of the packets addressed from the terminal A (30a) to the terminal C (30c) and the packet addressed from the terminal B (30b) to the terminal C (30c) is restored to obtain the original content in the node 10-n, which is the end point of the aggregatable segment.

Thus, packet handling operations for the nodes located intermediate on the aggregatable segment can be aggregated into the packet handling operation including the path identifier (e.g.: E1) as the matching rule. On the other hand, the packet handling operation for writing the flow identifier (e.g.: F1, or F2) and the path identifier (e.g.: E1) in the packet belonging to each flow is set in the node located at the start point of the aggregatable segment, and statistics information on the processed packet is recorded for each packet handling operation. Thus, identification of an abnormal traffic is facilitated.

First Exemplary Embodiment

Figure 2:
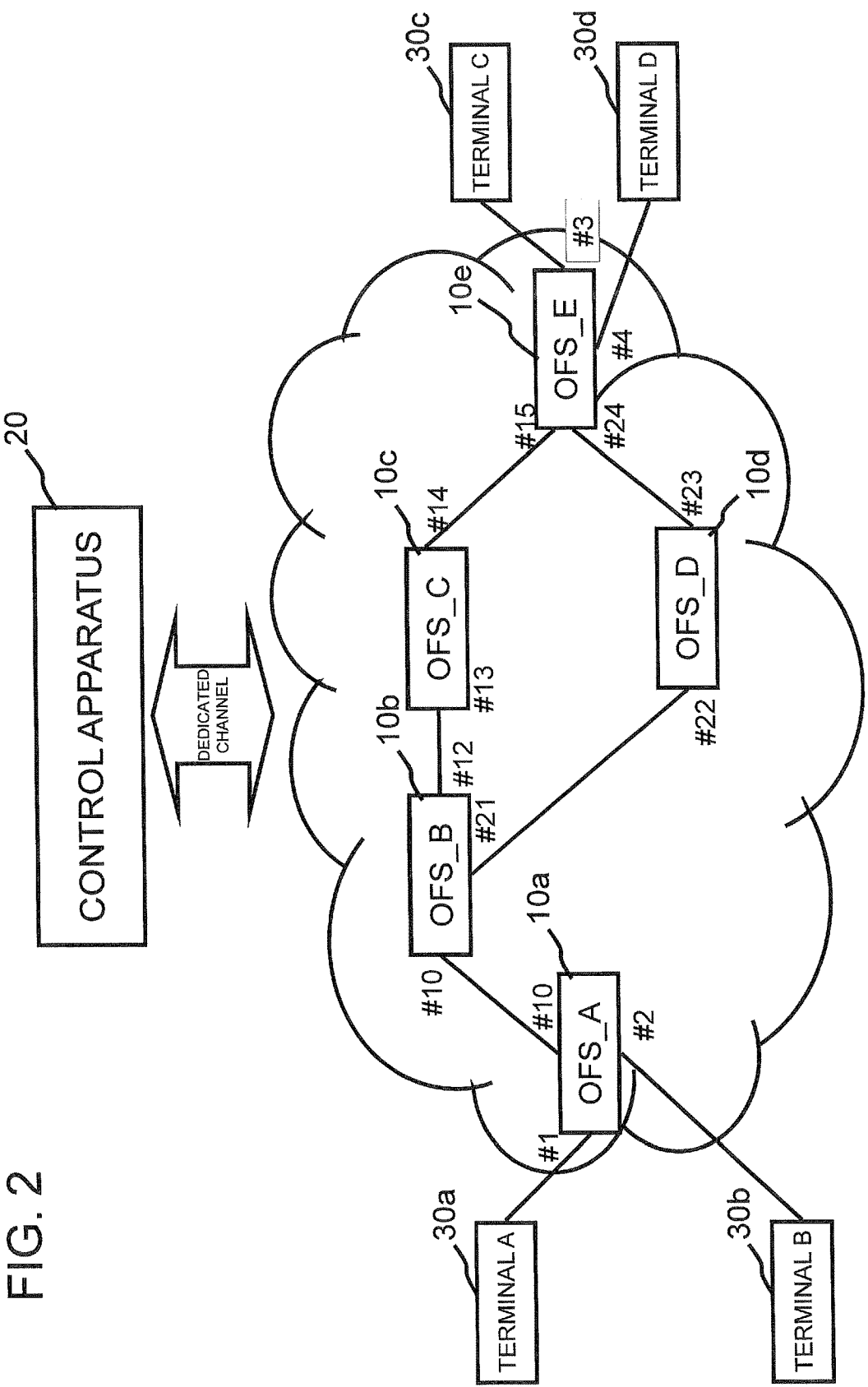
FIG. 2 is a diagram showing a configuration of a first exemplary embodiment of the present invention.

Next, a first exemplary embodiment of the present invention will be described in detail with reference to drawings. FIG. 2 is a diagram showing a configuration of the first exemplary embodiment of the present invention. Referring to FIG. 2, a plurality of OpenFlow switches (hereinafter referred to as "OFSs" when no particular distinction among the respective OFSs is made) 10a to 10e and a control apparatus 20 that sets a packet handling operation (flow entry) and collects statistics information are shown. Each OFS forwards a packet to be exchanged between each of terminals A and B and each of terminals C and D. The control apparatus 20 is connected to the OFSs 10a to 10e through a secure channel.

When each of the OFSs 10a to 10e receives a packet, each of the OFSs 10a to 10e searches a flow entry table (flow table) held therein for a flow entry that matches the packet, and executes processing content defined in the searched flow entry.

Referring to FIG. 2, it is assumed that symbols (#1 to #24) written for the OFSs 10a to 10e and written in the vicinity of ends of links between the respective terminals A to D and the respective OFSs 10a to 10e indicate port numbers of the OFSs. When a packet addressed from the terminal A to the terminal C is to be output to the OFS_C 10c by the OFS_B 10b, a flow entry defining processing (OUT_PORT: 12) of outputting the packet that matches the corresponding matching rule (matching rule) from a port #12 is set.

When each of the OFSs 10a to 10e receives a packet that does not match any flow entry stored in the flow entry table (flow table) therein, each of the OFSs 10a to 10e notifies information on the packet to the control apparatus 20, using a Packet-in message.

The control apparatus 20 that has received the Packet-in message selects a path for forwarding the packet and a subsequent packet belonging to the same flow as the packet that does not match any flow entry in the flow table therein, based on information on the transmission source and the transmission destination of the packet, and sets a flow entry in each OFS on the forwarding path of the packet.

Figure 3:
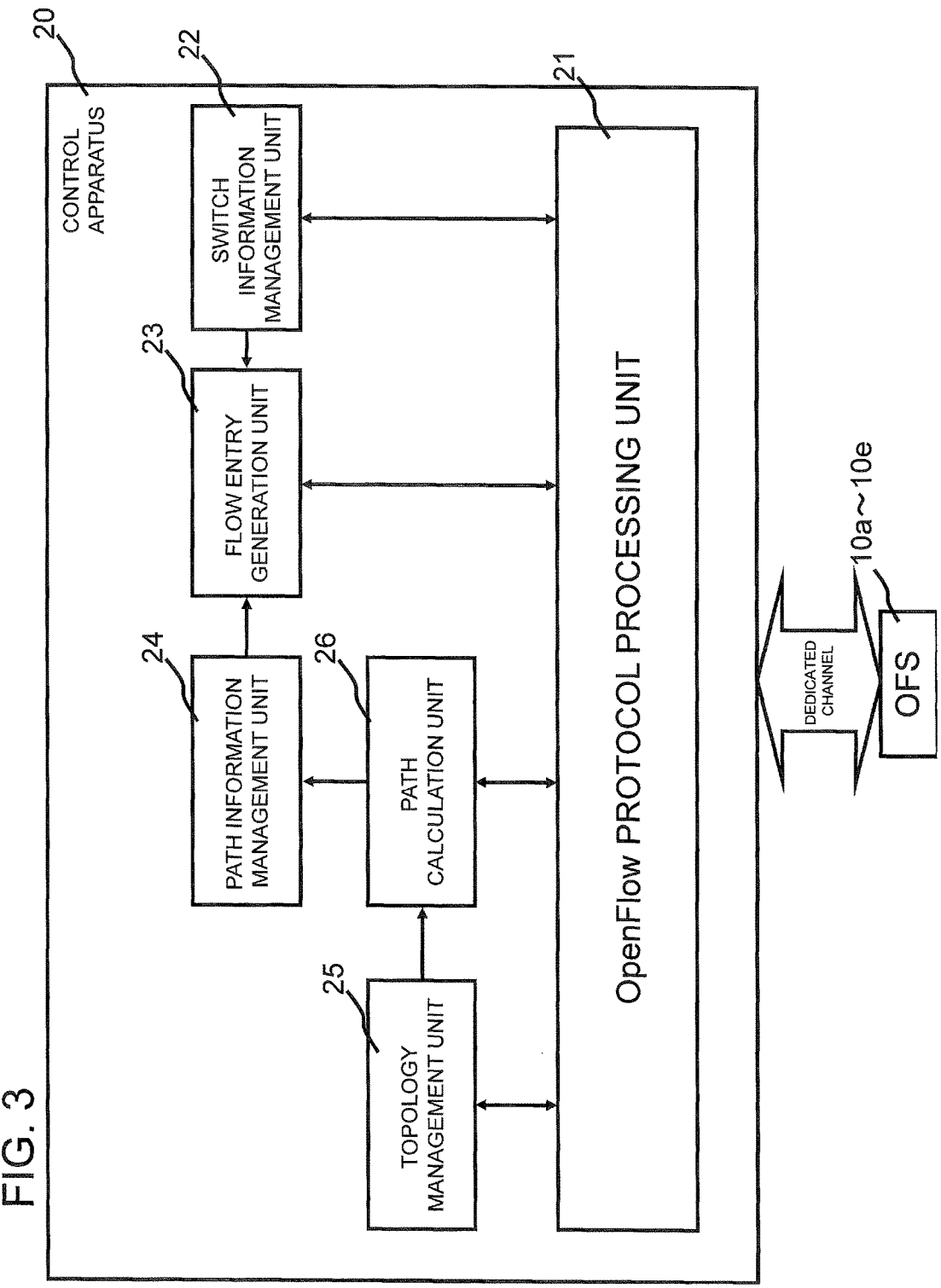
FIG. 3 is a block diagram showing a configuration of a control apparatus in the first exemplary embodiment of the present invention.

FIG. 3 is a block diagram showing a detailed configuration of the control apparatus 20. Referring to FIG. 3, the configuration including an OpenFlow protocol processing unit 21, a switch information management unit 22, a flow entry generation unit 23, a path information management unit 24, a topology management unit 25, and a path calculation unit 26 is shown.

The OpenFlow protocol processing unit 21 receives a request for setting a flow entry from each of the OFSs 10a to 10e, and also performs processing of instructing setting the flow entry, transmission of a packet, forwarding of recorded flow statistics information, and the like, using an OpenFlow protocol defined in Non Patent Literature 2.

The switch information management unit 22 collects and manages identification information and physical port information on the OFSs 10a to 10e and provides the collected and managed information to the flow entry generation unit 23. As a method of collecting the identification information and the physical port information on the OFSs 10a to 10e, a method of transmitting a Switch function inquiry message (Features Request) defined in Non Patent Literature 2 to each of the OFS 10a to 10e and then receiving a Switch function response message (Features Reply) from each of the OFS 10a to 10e can be used (refer to "5.3 Controller-to-Switch Messages" and after the "5.3 Controller-to-Switch Messages" in Non Patent Literature 2).

The topology management unit 25 holds topology information on the OpenFlow network. As the topology information, the topology information created in advance may be used, or the topology information may be created by using a method of collecting the topology information, employing a function such as an LLDP (Link Layer Discovery Protocol).

The path calculation unit 26 refers to the topology information held in the topology management unit 25 to generate a packet forwarding path between arbitrary ones of the OFSs.

The path information management unit 24 manages the packet forwarding path calculated by the path calculation unit 26, and provides information on the path to which a path ID is added as shown in FIG. 4, in response to a request from the flow entry generation unit 23. It is assumed herein that between the OFSs OFS_A to OFS_E in FIG. 2, a packet forwarding path E1 (OFS_A to OFS_E through OFS_B and OFS_C) and a packet forwarding path E2 (OFS_A to OFS_E through OFS_B and OFS_D) have been generated, based on the topology information that defines a connecting relationship among the OFSs 10a to 10e shown in FIG. 2.

The flow entry generation unit 23 selects one of the packet forwarding paths held in the path information management unit 24, based on information on the packet given from the OpenFlow protocol processing unit 21, and generates the flow entry to be set in each of the OFSs located at the start point of the packet forwarding path, located at the end point of the packet forwarding path, and located intermediate on the packet forwarding path so as to implement flow entry aggregation in the OFS located intermediate on the packet forwarding path.

Assume, for example, that the packet forwarding path E1 has been selected for a flow from the terminal A to the terminal C. Then, the flow entry generation unit 23 sets in the OFS_A 10a located at the start point of the selected packet forwarding path E1 a packet handling operation for converting the original transmission source MAC address of the header of a packet to a flow ID and converting the original destination MAC address of the header of the packet to a path ID, and then causing the packet to be output to the subsequent hop (OFS_B).

The control apparatus 20 also sets in each of the OFS_B 10b and the OFS_C 10c located intermediate on the packet forwarding path E1 a packet handling operation for causing the packet that matches the path ID (e.g.: E1) to be forwarded according to the packet forwarding path E1.

The control apparatus 20 sets in the OFS_E 10e located at the end point of the packet forwarding path a packet handling operation for performing processing of returning a transmission source MAC address and a destination MAC address of the packet that matches the flow ID and the path ID converted in the OFS_A 10a to the original transmission source MAC address and the original destination MAC address of the packet and then causing the packet to be output.

FIG. 5 is a table showing correspondence relationships among the MAC addresses to be converted by the flow entry generation unit 23.

The above-mentioned control apparatus 20 can also be realized by implementing a flow entry aggregation function that will be described later into an OpenFlow controller described in Non Patent Literatures 1 and 2. Each unit (processing means) of the control apparatus 20 shown in FIG. 3 can also be realized by a computer program that causes a computer constituting the control apparatus 20 to execute each of the above mentioned processing, using hardware of the computer.

Figure 6:
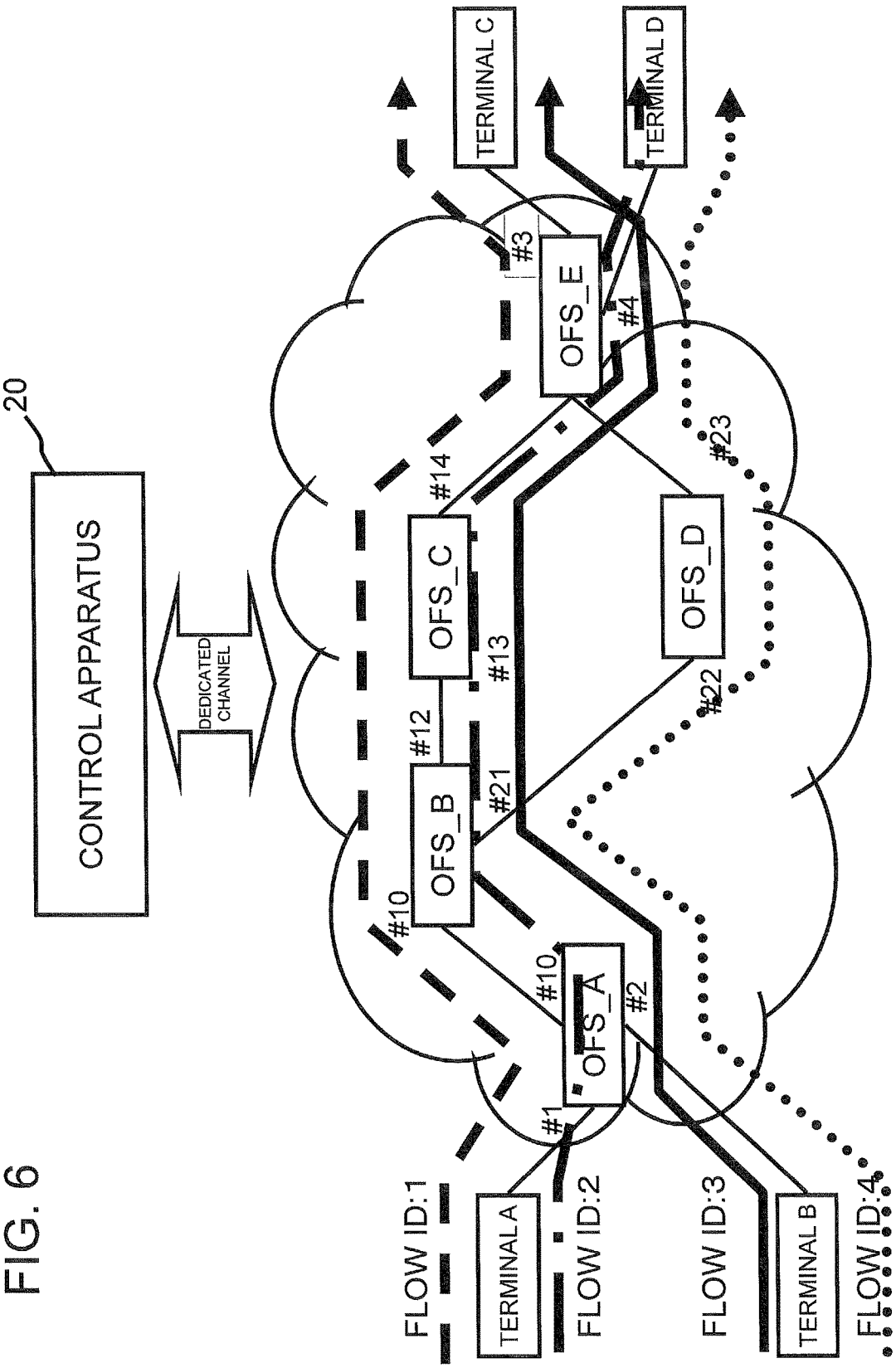
FIG. 6 is a diagram for explaining operations of the control apparatus in the first exemplary embodiment of the present invention.

Next, operation of this exemplary embodiment will be described in detail with reference to drawings. It is assumed, in the following description, that requests for setting flow entries have been made for flows having a flow ID of 1 flowing from the terminal A to the terminal C, a flow ID of 2 flowing from the terminal A to the terminal D, a flow ID of 3 flowing from the terminal B to the terminal C, and a flow ID of 4 flowing from the terminal B to the terminal D in this stated order. All of the flows were indicated by thick lines in FIG. 6, First, when the control apparatus 20 is asked from the OFS_A 10*a* to generate a flow entry for the flow from the terminal A to the terminal C, the control apparatus 20 selects the packet forwarding path E1 out of the packet forwarding paths shown in FIG. 4. Then, the control apparatus 20 generates and sets the flow entry in the OFS_A 10*a*. The flow entry is for respectively converting the transmission source MAC address and the destination MAC address of the header of a packet which has entered into the OFS_A 10*a* through a port #1 and whose transmission source MAC address is the MAC address of the terminal A and whose destination MAC address is the MAC address of the terminal C to the flow ID of 1 and the path ID of E1, and then causing the packet to be output to the subsequent hop (OFS_B) from a connection port #10.

The flow entry is generated and set at this point, as shown in the field defined by the "OFS_A" and the flow ID of 1 in FIG. 7. "MATCH" in FIG. 7 indicates the matching rule of the flow entry, or the matching rule. "ACTION" in FIG. 7 indicates the action field of the flow entry, or processing content to be applied to the packet. "IN_PORT", "DL_SRC", "DL_DST" respectively correspond to "In Port", "Ether SA", "Ether DA" of the flow entry in FIG. 13. "SET_XX_XXX" indicates an action of rewriting a header XX_XXX, while "OUT_PORT ##" means output of a packet from a ##th port.

The control apparatus 20 also generates and sets in the OFS_B 10*b* located intermediate on the packet forwarding path E1 a flow entry for causing the packet which has entered from a port #11 and whose destination MAC address is the path ID of E1 to be output from a port #12 with the OFS_C 10*c* connected thereto (refer to the field defined by the "OFS_B" and the flow ID of 1 in FIG. 7). Similarly, the control apparatus 20 generates and sets in the OFS_C 10*c* a flow entry for causing the packet which has entered from a port #13 and whose destination MAC address is the path ID of E1 to be output from a port #14 with the OFS_C 10*e* connected thereto (refer to the field defined by the "OFS_C" and the flow ID of 1 in FIG. 7).

The control apparatus 20 also generates and sets a flow entry in the OFS_E 10*e* located at the end point of the packet forwarding path E1. The flow entry is for respectively restoring the transmission source MAC address and the destination MAC address of the header of the packet which has entered from a port #15 and whose transmission source MAC address is the flow ID of 1 and whose destination MAC address is the path ID of E1 to the MAC address of the terminal A and the MAC address of the terminal C and then causing the packet to be output from a port #3 with the terminal C connected thereto (refer to the field defined by the "OFS_E" and the flow ID of 1 in FIG. 7).

Next, let us consider a case where the control apparatus 20 has been asked from the OFS_A 10*a* to generate a flow entry for a flow from the terminal A to the terminal D. Since the terminal D is connected to the OFS_E 10*e*, both of the packet forwarding paths E1 and E2 in FIG. 4 can be adopted as the packet forwarding path of the flow from the terminal A to the terminal D. It is assumed herein that the control apparatus 20 has selected the packet forwarding path E1, as in the case of the flow ID of 1 described before, in order to achieve flow entry aggregation.

In this case, the control apparatus 20 generates and sets the flow entry in the OFS_A 10*a*. The flow entry is for respectively converting the transmission source MAC address and the destination MAC address of the header of a packet which has entered into the OFS_A 10*a* through the port. #1 and whose transmission source MAC address is the MAC address of the terminal A and whose destination MAC address is the MAC address of the terminal D to the flow ID of 2 and the path. ID of E1, and then causing the packet to be output from the connection port #10 with the subsequent hop (OFS_B) connected thereto (refer to the field defined by the "OFS_A" and the flow ID of 2 in FIG. 7).

The control apparatus 20 also generates and sets a flow entry in the OFS_E 10*e* located at the end point of the packet forwarding path E1. The flow entry is for respectively restoring the transmission source MAC address and the destination MAC address of the header of the packet which has entered into the OFS_E 10*e* from the port #15 and whose transmission source MAC address is the flow ID of 2 and whose destination MAC address is the path ID of E1 to the MAC address of the terminal A and the MAC address of the terminal D and then causing the packet to be output from a port #4 with the terminal D connected thereto (refer to the field defined by the "OFS_E" and the flow ID of 2 in FIG. 7).

On the other hand, the flow entry for causing the packet whose destination MAC address is the path ID of E1 to be forwarded to the subsequent hop is already set in each of the OFS_B 10*b* and the OFS_C 10*c* located intermediate on the packet forwarding path E1. Thus, it is not necessary to generate and set the flow entry.

Also when the control apparatus 20 is asked from the OFS_A 10*a* to generate a flow entry for the flow from the terminal B to the terminal C, the control apparatus 20 generates flow entries involving rewriting and restoration of the header for only the OFS_A 10*a* and the OFS_E 10*e* (refer to the row defined by the flow ID of 3 in FIG. 7).

The control apparatus 20 can also be made to select a different forwarding path in view of a load in each OFS and service attribute of each flow. In the example in FIG. 7, for example, when the control apparatus 20 is asked from the OFS_A 10*a* to generate a flow entry for the flow from the terminal B to the terminal D, the control apparatus 20 selects the packet forwarding path E2, and generates and sets a flow entry in each of the OFSs 10*a* to 10*e*. (refer to the row defined by the flow ID of 4 in FIG. 7).

The above description was directed to the operation of this exemplary embodiment. It may be so arranged that the above-mentioned control apparatus 20 can select a plurality of operation modes, and can select between an aggregation mode where flow entries are aggregated and a nonaggregation mode where flow entries are not aggregated.

FIG. 8 is a table showing a flow entry to be set in each of the OFSs 10*a* to 10*e* when the above-mentioned aggregation is not performed. As clear from comparison between FIGS.

7 and 8, this exemplary embodiment succeeds in reducing the number of flow entries of the OFS_B 10*b* to 2 from 4. This exemplary embodiment succeeds in reducing the number of flow entries of the OFS_C 10*c* to 1 from 3. The number of flow entries that can be reduced can be estimated as "the number of flows that have been aggregated×(the number of nodes on a packet forwarding path−2). The OFS_A 10*a* also performs matching with an input packet for each flow, so that which one of flows having the flow IDs of 1 to 4 has caused an abnormal traffic can be readily identified.

When a change in a path is caused by occurrence of a failure in the path, it becomes necessary to set/reduce all flow entries that may be affected, in the nonaggregation mode as FIG. 8. However, when the aggregation is performed as in FIG. 7, the number of flow entries to be set/deleted is reduced. Thus, a switch process time can be reduced, and failure-tolerant performance is also improved.

Though the number of flow entries in each of the OFS_A 10*a* and the OFS_E 10*e* increases in this exemplary embodiment as compared with a case where flows having a same destination have been aggregated as shown in FIG. 9, it does not happen that flows 1 and 3 are mixed and flows 2 and 4 are mixed to make it difficult to determine which one of the flows has caused an abnormal traffic.

Each of FIGS. 10 to 12 summarizes a difference between a flow entry to be set in each OFS in the aggregation mode described in this exemplary embodiment and a flow entry to be set in the nonaggregation mode as shown in FIG. 8. In the following description, an OFS located at the start point of a packet forwarding path and connected to an external node will be referred to as an Ingress OFS, an OFS located at the end point of the packet forwarding path and connected to an external node will be referred to as an Egress OFS, and an OFS between the Ingress and Egress will be referred to as a Core OFS.

FIG. 10 is a table showing the difference of the flow entry to be set in the Ingress OFS from that to be set in the nonaggregation mode. As shown in FIG. 10, conversion of the transmission source MAC address and the destination MAC address is added in the Ingress OFS as an action, which is different from the flow entry to be set in the nonaggregation mode. With this arrangement, flow entry aggregation in the Core OFS and packet restoration in the Egress OFS are achieved.

FIG. 11 is a table showing the difference of the flow entry to be set in the Core OFS from that to be set in the nonaggregation mode. In the Core OFS shown in FIG. 11, the flow entry whose matching rule is a path ID obtained by conversion in the Ingress OFS is set.

FIG. 12 is a table showing the difference of the flow entry to be set in the Egress OFS from that to be set in the nonaggregation mode. As shown in FIG. 12, an action of restoring the transmission source MAC address and the destination MAC address is added in the Egress OFS, using a flow ID and the path ID obtained by conversion in the Ingress OFS in addition to an In_Port field, as a matching key. This is different from the flow entry to be set in the nonaggregation mode.

The above description was directed to the preferred exemplary embodiment. The present invention is not, however, limited to the above-mentioned exemplary embodiment. The present invention may be further varied, replaced, and adjusted without departing from the basic technical concept of the present invention.

To take an example, the flow entry to be set in the OFS located intermediate on the packet forwarding path uses the path ID as the matching rule. Thus, it is possible to set the flow entry in advance without waiting for a request for setting the flow entry from the OFS. In this case, the control apparatus 20 should set the flow entry for causing the OFS located at the start point of the packet forwarding path to rewrite the header according to the matching rule set in advance. Further, the control apparatus 20 should set the flow entry for causing the OFS located at the end point of the packet forwarding path to restore the header. A load on the control apparatus 20 is thereby reduced.

In the above-mentioned exemplary embodiment, the description was given, assuming that the path ID is used as the matching rule. The MAC address of the Egress OFS, a forwarding identifier associated with the aggregation segment, or etc. can also be used as the path ID.

In the above-mentioned exemplary embodiment, the description was given, assuming that the transmission source/destination MAC address is to be rewritten. A configuration can also be adopted where identifiers corresponding to the flow ID and the path ID are written in ones of fields shown in FIG. 13 not used for forwarding from each node (OFS) or the like, or these flow ID and path ID are rewritten from the original IDs and are deleted or restored at the end point of the packet forwarding path.

In the above-mentioned exemplary embodiment, the description was given, assuming that packet header conversion and packet header restoration are to be performed in the OFS (edge node) connected to each of the external nodes (terminals A to D). Packet header conversion and packet header restoration may be performed in an arbitrary one of the core OFSs (core nodes) located to the inner side of the OFS connected to each of the external nodes (terminals A to D). A flow entry for performing the restoration in each of the OFS_C 10*c* and the OFS_D 10*d* in FIG. 2 and then performing packet processing in the OFS_E 10*e* based on an original packet may be set, for example. Alternatively, a variation of the exemplary embodiment is also possible where a flow entry for performing packet processing based on the original packet is set in the OFS_A 10*a* in FIG. 2, and packet header conversion is performed in the OFS_B 10*b* in FIG. 2 to achieve flow entry aggregation in the OFS_C 10*c* and the OFS_D 10*d*, for example.

In the above-mentioned exemplary embodiment, the description was given, assuming that the control apparatus 20 includes the topology management unit 25 and the path calculation unit 26 to calculate a path by itself. However, a configuration can also be adopted where a device for supplying information on a path calculated by the device to the control apparatus 20 is separately provided.

Finally, preferred modes of the present invention will be summarized.

[First Mode]

(See the communication system in the first aspect described above)

[Second Mode]

The communication system according to the first mode, wherein in the node located intermediate on the aggregatable segment, the packet handling operation for causing the packet that matches the path identifier to be forwarded according to the packet forwarding path calculated in advance is set; and the packet forwarding path calculated in advance is assigned when a request for setting the packet handling operation is newly received.

[Third Mode]

The communication system according to the first or second mode wherein the flow identifier is written in a transmission source MAC address field of a packet header.

[Fourth Mode]

The communication system according to any one of the first to third modes, wherein the path identifier is written in a destination MAC address field of the packet header.

[Fifth Mode]

The communication system according to any one of the first to fourth modes, wherein the nodes located at the start point and the end point of the aggregatable segment are edge nodes each disposed at a boundary with an external node; and the node located intermediate on the aggregatable segment is a core node disposed between the edge nodes.

[Sixth Mode]

The communication system, wherein the control apparatus further includes a path calculation unit that calculates the packet forwarding path in response to a request from the node.

[Seventh Mode]

(See the control apparatus in the second aspect described above)

[Eighth Mode]

The control apparatus according to the seventh mode, wherein the control apparatus sets, in the node located intermediate on the aggregatable segment, the packet handling operation for causing the packet that matches the path identifier to be forwarded according to the packet forwarding path calculated in advance; and when newly receiving a request for setting the packet handling operation, the control apparatus assigns the packet forwarding path calculated in advance.

[Ninth Mode]

The control apparatus according to the seventh or eighth mode, wherein the flow identifier is written in a transmission source MAC address field of a packet header, and the path identifier is written in a destination MAC address field of the packet header.

[Tenth Mode]

The control apparatus according to any one of the seventh to ninth modes, wherein the control apparatus further includes a path calculation unit that calculates the packet forwarding path in response to a request from the node.

[Eleventh Mode]

(See the packet handling operation setting method in the third aspect described above)

[Twelfth Mode]

(See the program in the fourth aspect described above)

The eleventh and twelfth modes can be developed into the second to sixth modes, like the first mode.

Modifications and adjustments of the exemplary embodiment and an example are possible within the scope of the overall disclosure (including claims) of the present invention, and based on the basic technical concept of the invention. Various combinations and selections of various disclosed elements (including each element of each claim, each element of each example, each element of each drawing, and the like) are possible within the scope of the claims of the present invention. That is, the present invention of course includes various variations and modifications that could be made by those skilled in the art according to the overall disclosure including the claims and the technical concept.

REFERENCE SIGNS LIST 10-1~10-$n$ node
10$a$~10$e$ OFS (OpenFlow switch)
20 control apparatus
21 OpenFlow protocol processing unit
22 switch information management unit
23 flow entry generation unit
24 path information management unit
25 topology management unit
26 path calculation unit
30$a$~30$d$ terminal

What is claimed is:

1. A communication system comprising:
a plurality of nodes each of which processes a received packet according to a packet handling operation associating processing to be applied to a packet and a matching rule for identifying the packet to which the processing is to be applied, and records statistics information on the packet processed per the packet handling operation; and
a control apparatus that sets the packet handling operation in each of the nodes; wherein
the control apparatus sets, in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths,
the control apparatus sets, in the node located intermediate on the aggregatable segment, a packet handling operation common to the respective flows for causing the packet that matches the path identifier to be forwarded according to the packet forwarding path, and
the control apparatus sets, in the node located at an end point of the aggregatable segment, a packet handling operation for performing processing of restoring content rewritten in the node located at the start point of the aggregatable segment based on the flow identifier and then causing the packet to be output,
wherein the control apparatus sets in the node located at the start point of the aggregatable segment, the packet handing operation to perform the matching against the matching rule with the received packet for each flow, so that one of the flows having a flow identification that caused an abnormal traffic is identified.

2. The communication system according to claim 1, wherein
the control apparatus sets, in the node located intermediate on the aggregatable segment, the packet handling operation for causing the packet that matches the path identifier to be forwarded according to the packet forwarding path calculated in advance; and
when newly receiving a request for setting the packet handling operation, the control apparatus assigns the packet forwarding path calculated in advance.

3. The communication system according to claim 1, wherein characterized in that said communication unit receives a processing rule determined by said control device based on a policy corresponding to a user of the terminal itself.

4. The communication system according to claim 1, wherein the path identifier is written in a destination MAC address field of the packet header.

5. The communication system according to claim 1, wherein the nodes located at the start point and the end point of the aggregatable segment are edge nodes each disposed at a boundary with an external node; and the node located intermediate on the aggregatable segment is a core node disposed between the edge nodes.

6. A control apparatus connected to a plurality of nodes each of which processes a received packet according to a packet handling operation associating processing to be applied to a packet and a matching rule for identifying the packet to which the processing is to be applied, and records statistics information on the packet processed per the packet handling operation;
the control apparatus comprising:
setting in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;
setting in the node located intermediate on the aggregatable segment, a packet handling operation common to the respective flows for causing the packet that matches the path identifier to be forwarded according to the packet forwarding path; and
setting in the node located at an end point of the aggregatable segment, a packet handling operation for performing processing of restoring content rewritten in the node located at the start point of the aggregatable segment based on the flow identifier and then causing the packet to be output,
wherein the control apparatus sets in the node located at the start point of the aggregatable segment, the packet handing operation to perform the matching against the matching rule with the received packet for each flow, so that one of the flows having a flow identification that caused an abnormal traffic is identified.

7. The control apparatus according to claim 6, wherein the control apparatus sets, in the node located intermediate on the aggregatable segment, the packet handling operation for causing the packet that matches the path identifier to be forwarded according to the packet forwarding path calculated in advance; and
when newly receiving a request for setting the packet handling operation, the control apparatus assigns the packet forwarding path calculated in advance.

8. The control apparatus according to claim 6, wherein the flow identifier is written in a transmission source MAC address field of a packet header, and the path identifier is written in a destination MAC address field of the packet header.

9. A packet handling operation setting method of a control apparatus connected to a plurality of nodes each of which processes a received packet according to a packet handling operation associating processing to be applied to a packet and a matching rule for identifying the packet to which the processing is to be applied and records statistics information on the packet processed per the packet handling operation, the method comprising:
setting, in the node located at a start point of an aggregatable segment of two or more packet forwarding paths including the aggregatable segment, a packet handling operation for each flow, the packet handling operation being for writing a flow identifier for identifying the flow and a path identifier used for packet forwarding through the aggregatable segment in a region of each of packets to be matched against the matching rule and then causing the packet to be output, the packets respectively belonging to the individual flows and each of the packets being to be forwarded through a corresponding one of the two or more packet forwarding paths;
setting, in the node located intermediate on the aggregatable segment, a packet handling operation common to the respective flows for causing the packet that matches the path identifier to be forwarded according to the packet forwarding path;
setting, in the node located at an end point of the aggregatable segment, a packet handling operation for performing processing of restoring content rewritten in the node located at the start point of the aggregatable segment based on the flow identifier and then causing the packet to be output; and
setting in the node located at the start point of the aggregatable segment, the packet handing operation to perform the matching against the matching rule with the received packet for each flow, so that one of the flows having a flow identification that caused an abnormal traffic is identified.

10. The communication system according to claim 2, wherein the flow identifier is written in a transmission source MAC address field of a packet header.

11. The communication system according to claim 2, wherein the path identifier is written in a destination MAC address field of the packet header.

12. The communication system according to claim 3, wherein the path identifier is written in a destination MAC address field of the packet header.

13. The communication system according to claim 2, wherein the nodes located at the start point and the end point of the aggregatable segment are edge nodes each disposed at a boundary with an external node; and the node located intermediate on the aggregatable segment is a core node disposed between the edge nodes.

14. The communication system according to claim 3, wherein the nodes located at the start point and the end point of the aggregatable segment are edge nodes each disposed at a boundary with an external node; and
the node located intermediate on the aggregatable segment is a core node disposed between the edge nodes.

15. The communication system according to claim 4, wherein the nodes located at the start point and the end point of the aggregatable segment are edge nodes each disposed at a boundary with an external node; and the node located intermediate on the aggregatable segment is a core node disposed between the edge nodes.

16. The control apparatus according to claim 7, wherein
the flow identifier is written in a transmission source MAC address field of a packet header, and the path identifier is written in a destination MAC address field of the packet header.

17. The communication system according to claim 1,
wherein the control apparatus sets specifically, in the nodes located at the start point, intermediate, and the end point of the aggregatable segment, the packet handling operations to identify a flow that has caused an abnormal traffic.

18. The communication system according to claim 1,
wherein the control apparatus sets specifically, in the nodes located at the start point, intermediate, and the end point of the aggregatable segment, the packet handling operations in order to aggregate the packet handling operations and identify abnormal traffic.

\* \* \* \* \*